Nov. 4, 1941.  F. L. NOVAK ET AL  2,261,857
ELECTRIC DISTRIBUTION SYSTEM
Filed Feb. 18, 1939  3 Sheets-Sheet 1
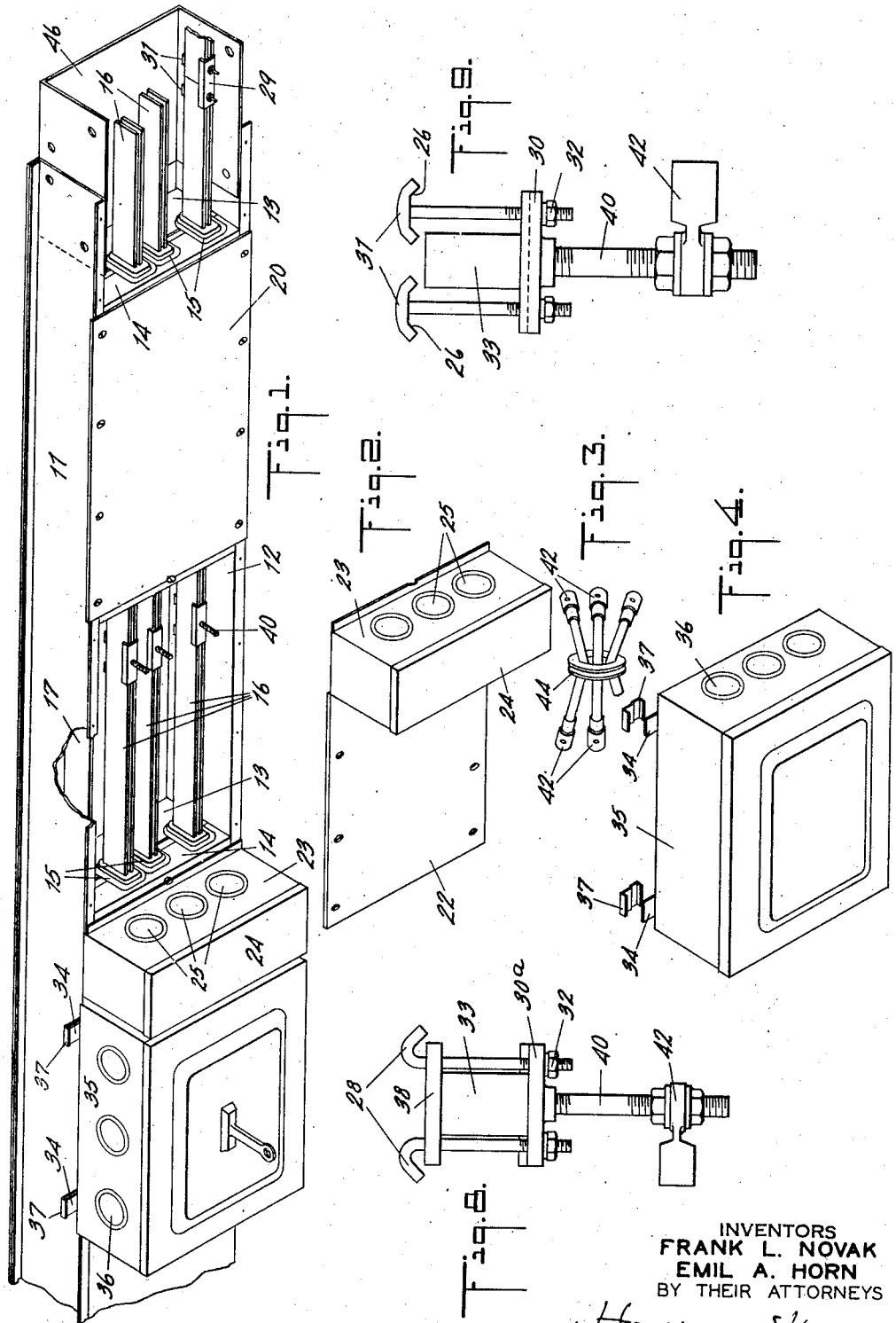
INVENTORS
FRANK L. NOVAK
EMIL A. HORN
BY THEIR ATTORNEYS
Howson and Horton Nov. 4, 1941.                F. L. NOVAK ET AL                2,261,857
                          ELECTRIC DISTRIBUTION SYSTEM
                          Filed Feb. 18, 1939         3 Sheets-Sheet 2

INVENTORS
FRANK L. NOVAK
EMIL A. HORN
BY THEIR ATTORNEYS

Nov. 4, 1941.　　　F. L. NOVAK ET AL　　　2,261,857
ELECTRIC DISTRIBUTION SYSTEM
Filed Feb. 18, 1939　　　3 Sheets-Sheet 3
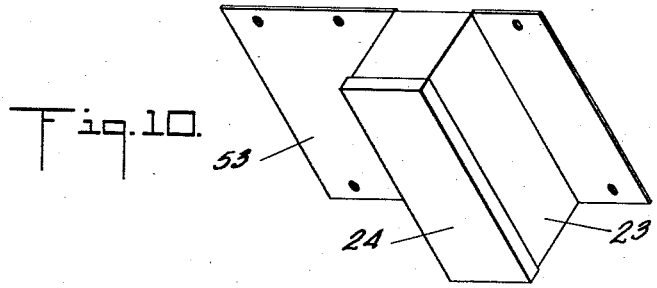
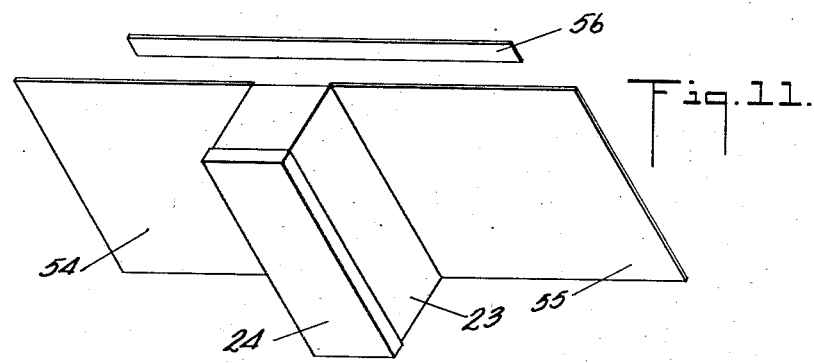
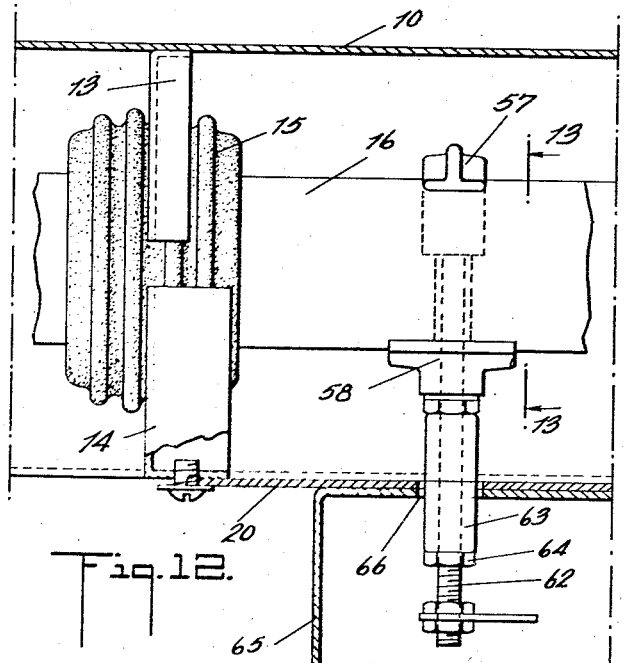
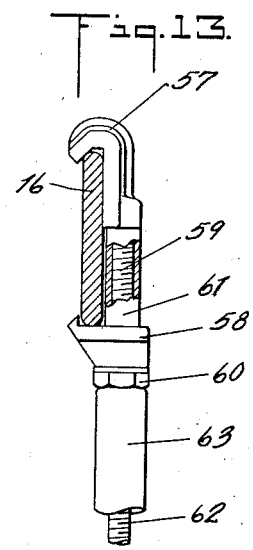
INVENTORS
FRANK L. NOVAK
EMIL A. HORN
BY THEIR ATTORNEYS Patented Nov. 4, 1941

2,261,857

UNITED STATES PATENT OFFICE 2,261,857

ELECTRIC DISTRIBUTION SYSTEM

Frank L. Novak, Maplewood, N. J., and Emil A. Horn, Jamaica, N. Y., assignors to Feedrail Corporation, New York, N. Y., a corporation of New York Application February 18, 1939, Serial No. 257,264

17 Claims. (Cl. 174—72)

This invention relates to electric distribution systems, and more particularly to an enclosed bus bar feeder system providing flexibility in power distribution which cannot readily be given by the use of panel boards.

As distinguished from earliest systems of mechanical power distribution in which the machines or power tools of a factory were driven from a single common prime mover by belting and shafting, the more modern practice, particularly in the larger industrial factories, is the provision of a separate electric motor for driving each machine independently of the others, constituting an individual drive system.

Inasmuch as many of the machines or tools are stationary, by reason of their weight or their fixed position as a station in the routing of products through the factory, the power for the individual motors was first supplied by permanent pipe conduits which were embedded in concrete or masonry; or otherwise built into the wall or floor of the factory building. Hence, if any change in the system was necessary, the part of the conduit affected had to be torn out, so that the conduit could be cut and spliced or branched, and the masonry or other building material replaced after the joint was made.

The development of manufacture for the production of new or improved products, changes in routing to effect economies, expansion to increase production, modernization of machinery for various operations, and other changing conditions, required more and more changes in the location of the individual drive motors, and the amount of tearing out and replacement of permanent conduits became prohibitive.

An early attempt to cope with these conditions is represented by Frank Patent No. 1,986,965, which provided a rectangular section wiring duct spaced from the walls and roof of the building, made up of standard length sections of duct, with elbows, T's, crosses, etc. These elements had knockouts spaced along their side walls, and each element had its entire top wall hinged so that the duct could be opened up to expose the wires therein for splicing thereto cables entering the knockouts. This provision facilitated the rebuilding of the conduit without disturbing the masonry.

Another expedient to facilitate the making of connections is represented by the Gerlach et al. Patent No. 1,965,181, which provides a permanent enclosed duct with holes provided at uniformly spaced intervals, through which plugs could be inserted to take off power. Obviously such expedients are limited to locations at the predetermined regular spacing, and make no provision for taking off current at intermediate points between the fixedly spaced holes in the otherwise permanent duct. There are many factors, such as interference or projection of other machinery or routing paths, which may render it inadvisable or impossible to take off the current at the location predetermined by the inflexible spacing of the holes in the duct.

It is, therefore, the main object of the present invention to provide an industrial distribution system or duct for supplying current to individual drive motors or local sub-systems which is of universal flexibility, and adapted for the taking off of power at any point along its length.

According to the present invention, the distribution system consists of a number of unit sections joined together in end to end relation, angle joints or bends, such as elbows, T's or crosses being provided, if desired. The unit sections each comprise a closed casing with a plurality of longitudinally parallel bus bars mounted therein and insulated therefrom.

The casing of each unit section is of sheet metal construction, preferably of rectangular cross section, with one face entirely removable in selective sections, that is to say, it is made up of fractional parts, any one or more of which may be removed or replaced without disturbing the remaining fractional parts thereof. This arrangement provides access to the bus bars for making connections thereto.

For incremental locations within a fractional part, there are alternate provisions. One provision is a replacement plate embodying a preformed outlet box, the plate being reversible or slidable to adjusted positions of location of the outlet box. The other provision is a slidably adjustable conductor clamp with a projecting terminal carrying its own insulation, so as to emerge through holes cut at the time in any desired location in the plate removed.

This selective fractional removal and selective incremental location within the removed fraction permits connections to be made for taking off power at any point along the section and hence throughout the system.

It will be understood that the desired fractional removal can be provided in any face or longitudinally extending component of the duct casing. The other longitudinally extending component is relatively permanent, and the bus bars are mounted in the relatively permanent component. Hence, the duct section is preferably divided longitudinally into complementary parts, one of which carries the bus bars, and the other of which is divided transversely into separate fractions spaced longitudinally thereof, the fractions being arranged in contacting relation, and the side margins of the fractions being removably secured to the side margins of the relatively permanent bus bar carrying longitudinally extending complementary part of the duct casing.

Heretofore, for joining successive lengths of bus bars, bolted fish plates have been employed. This requires bolt holes in the bus bars, resulting in weakening the same and also necessitating accurate register as well as manual tightening of the nuts by lever wrenches. Also, for connecting branch circuits, the plug in type of connector provides only spring pressure contact with the bus bars.

It is, therefore, a further object of the present invention to join the bus bars in end to end relation or to branch connectors without perforating the bus bars, to provide screw pressure contact with the bus bars, and to permit access to such connections by axial wrenches or power tools.

Further objects of this invention are to provide an inexpensive construction for a system of this character, with improved flexibility of mechanical and electrical connection, and providing bolted connections in cases of permanent or semi-permanent installation, and with ready facilities for rearrangement or expansion of the system.

Other objects will be apparent from the following description, in conjunction with the accompanying drawings, in which:

Figure 1 is a perspective view of a portion of an electric distribution system according to the preferred embodiment of the present invention, showing the same as supported overhead in a factory or the like, with one of the portable plates removed to show the internal construction, one end of the unit section being shown open to expose the joint construction;

Figure 3 is a detail of the insulated bushing and conductors passing therethrough;

Figure 4 is a perspective view of the switch box, this view combining with Figures 1, 2 and 3 as an exploded view;

Figure 7 is a perspective view of the adjustable conduit casing section;

Figure 8 is a detail of the current take-off connector, preferably for relatively light current;

Figure 9 is a detail of the connector for relatively heavy current;

Figure 10 is a modified form of Figure 2;

Figure 11 is a further modification of Figure 2;

Figure 12 is a longitudinal section of a portion of the duct casing, showing a modified connection; and Figure 13 is a section taken along the line 13—13 of Figure 12.

Figures 5, 6:
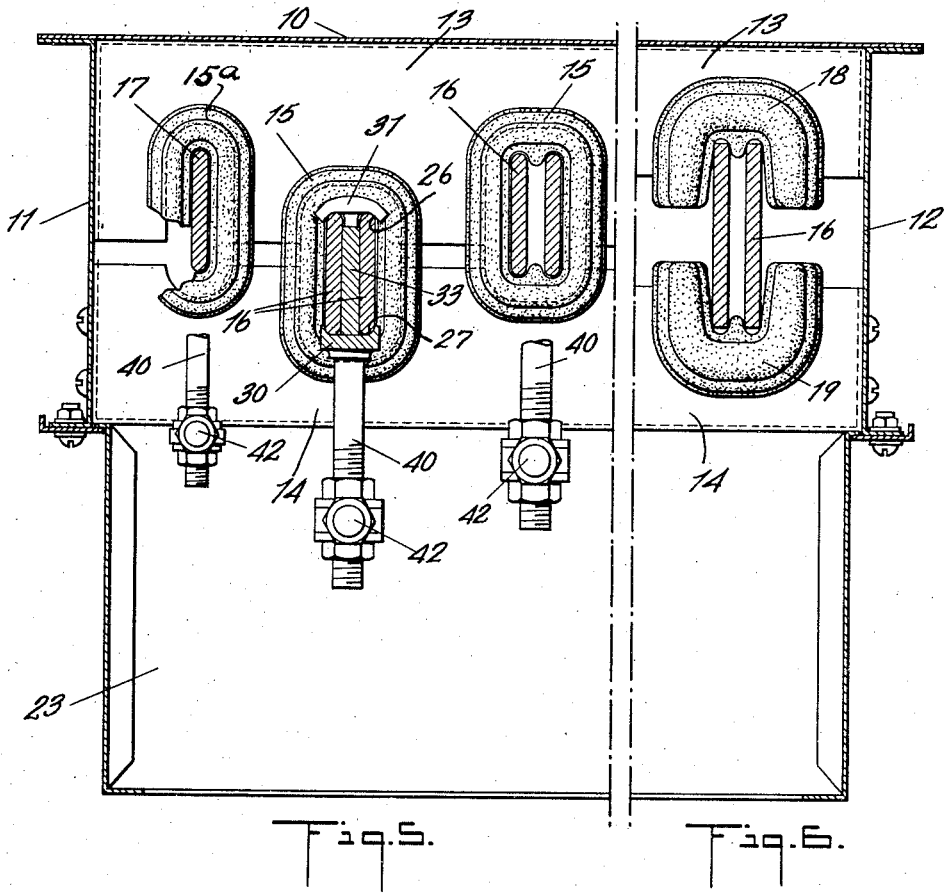
Figure 5 is a transverse vertical section through the conduit section and the cover junction box, showing the bus bars, insulators and connection terminals.
Figure 6 is a modification of Figure 5.

Referring more particularly to the drawings, each unit section of the duct casing is constructed of sheet metal in standard lengths, which may be of any desired cross-sectional contour, although the preferred embodiment shown is rectangular. The relatively permanent longitudinally extending component in this example is channel shaped, in the form of an open trough. This trough comprises a flat top plate 10 and side plates 11 and 12, which in the illustrated embodiment are flanged outwardly at the top and bottom, the top flanges being welded or bolted to the top plate 10.

The relatively permanent component of the sheet metal casing is provided with insulator supports, which in the trough example shown, form unit compartments, the walls of which serve to restrict short circuits and also serve to exclude dust. These walls are formed of two pieces of sheet metal 13 and 14, which are notched to take bushing type insulators 15. The upper partition or spacer plate 13 is preferably welded to the top and sides of the trough, while the lower complementary partition plate 14 is preferably bolted into place, although for some purposes it is preferable to bolt the upper plate 13 into place instead of welding. The plate 14 is preferably flanged at its lower portion, and preferably serves to support the ends of the sectionalized covers for the casing, to be hereinafter described.

A plurality of longitudinally parallel bus bars 16 are mounted in the insulators supported by the relatively permanent component of the sheet metal casing. A three phase installation is shown, having a double bus bar for each phase comprising a pair of single bus bars in parallel spaced relation. A single return bus bar is also provided.

The insulators 15 and the insulators 15a, as shown in Figure 5, preferably comprise a single annular sleeve or ring of porcelain, Bakelite, or other insulating material, although a split ring form of insulator comprising complementary portions 18 and 19, as shown in Figure 6, may be employed, and even preferred, for larger sizes of bus bars. These insulators are preferably provided with exterior annular grooves to singly receive the notches of the plates 13 and 14. While these insulators are slidable longitudinally along the respective pairs of bus bars, their inner surfaces are grooved and ridged to maintain the pair constituting each phase in spaced parallel relation.

An important feature of this insulator support is that a great many variations of construction can be made up with very few porcelain molds. For instance, a five or six double bus bar assembly can be made up without making any additional porcelain molds for this purpose. The only additional work is to fabricate the partitions with the proper number of notches in them. The two piece form of insulator has the added advantage that the same form may take varying depths or widths of bus bar. Of course, the standard width and depth of the unit section of sheet metal casing for a particular run can be increased or diminished, as desired, no special machinery being required for the fabrication of the rectangular cross-sectional shape in any size desired.

The relatively permanent component of the unit duct section may, of course, be embodied in a great many different constructions other than the specific form just described, but, however the same is constructed, the flexibility provided by the present invention is attained by the fractionalized selectively removable construction of the longitudinal component which exposes the bus bars for the purpose of making connections for branch conductors. The selective fractional construction may also be varied by many modifications, but the preferred embodiment is shown and described as an example.

As shown in Figure 1, the cover for the open face of the trough is made up of portable plates 20, each plate or fraction being selectively removable independently of the others. It should be noted that no part of this cover is of permanent construction, and hence any point on the length of the bus bars may be exposed by selecting the plate covering that point. In the form shown, the fractional face is divided transversely, and the plates 20 extend from the lower flange of the side plate 11, across the casing opening, to the lower flange of the other side plate 12.

The plates 20 are removably secured in position in longitudinally contacting relation, various dust excluding types of joint being provided, if desired. These sectionalized covers may be all of the same lengths, or sequences of different lengths, but in the form shown, are so proportioned that one size or length of fractional part not only serves for the intermediate portion of the casing, but also affords continuity at the section to section joints of the duct casing. For example, if the plates 10, 11 and 12 are made up in 10 foot lengths and the plates 20 are made up in 2 foot lengths, four of the plates 20 are assembled on each section, leaving one foot on each end of the trough to be covered by an additional standard plate 20 which will overlap the joint of two adjacent duct unit sections. Obviously other lengths or sequences can be provided intermediate the ends while maintaining the overlap condition at the casting joints.

After the system of unit duct sections has been installed as above described, and it is desired to tap off current for a branch connector at any point, the particular plate 20 which is located over the desired point is removed, exposing the bus bars and leaving ample room for manipulation to make the connection. This condition is illustrated in Figure 1.

In order that the connection may be made at the desired point within the length exposed by removal of the particular plate 20, and thereby render the system capable of permitting connection at any point throughout the system, clamps of special design are provided which are introduced through the access opening, and capable of attachment to the bus bars at any selected position therealong.

For the double bus bars shown, a clamp is provided which can be inserted between the bus bars and fastened in such a manner that the bus bars are forced together on a tongue of copper providing a large surface of contact. It also gives a very firm line of contact between the lower plate or jaw and the bus bars therefore providing not only a surface contact, but also a strongly clamped edge contact.

The form of tap off terminal connector shown in Figure 9 comprises a channel-shaped jaw 30 which is adapted to receive the lower edges of a pair of bus bars. This jaw 30 carries bolts having T-shaped heads 31 which are adapted to be inserted between the bus bars of the pair, when the T-shaped heads are in longitudinal alignment therewith. The T-shaped heads 31 are then turned transversely as shown in Figure 5, and the nuts 32 on these bolts are tightened, securely clamping the jaws 30 and 31 in edge to edge relation with the pair of bus bars. A plug 33 comprising a block or bar of conducting material is inserted between the bus bars of a pair, and makes surface to surface contact with the inner surfaces of the bus bars when the connector bolts are tightened.

It should be noted that as shown in Figure 5, the heads 31 have tapered surfaces 26, and the jaw 30 has tapered surfaces 27, so that when these abutments are drawn together, they not only clamp the edges of the bus bars under pressure contact, but also cam the bus bar side surface into pressure contact with the side surface of the plug or tongue 33. The jaw 30 is provided with a terminal post 40, the lower end of which is threaded to receive nuts for securing a conductor such as shown at 42.

A modified form of the clamp connector according to Figure 9 is shown in Figure 8, which is primarily intended for lighter current. This form has a jaw 30a and the same plug 33 and nuts 32, but instead of the T-head 31, a hooked head 28 is provided. An upper jaw 38 is also provided, through which pass the bolts having the hooked heads 28. The terminal 40 and the conductor 42 are the same as described in connection with Figure 9.

Figure 2:
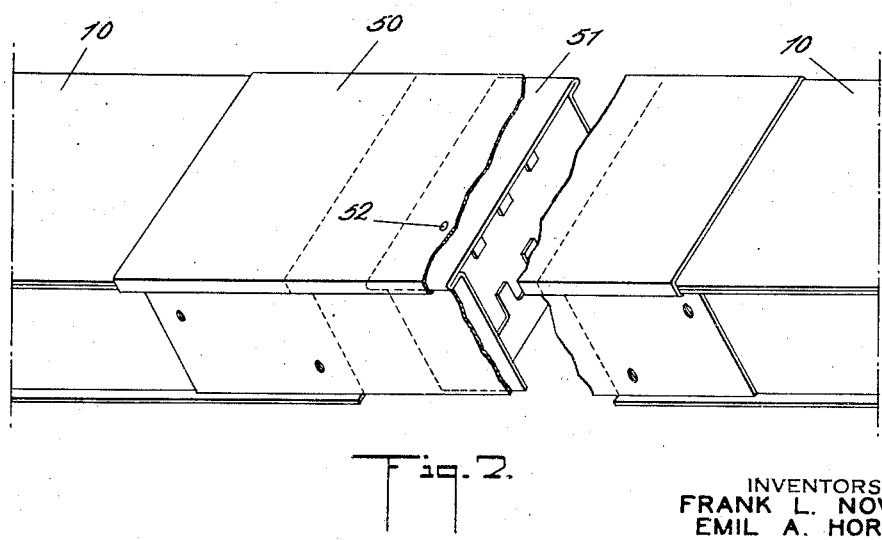
Figure 2 is a perspective view of the sheet metal replacement cover plate construction embodying the junction box, this view being positioned to form with Figure 1 an exploded view.

After the connectors with their terminals 40, just described, have been mounted in the desired position, the removed cover plate 20 is replaced with a tap off cover, such as shown in Figure 2. This tap off cover has a junction box formed on one end of it. This junction box is provided with a removable cover 24 and is provided with knock-outs 25 on all sides for the attachment of conduit. When the cover of this junction box is removed, the wiring connections to the terminals 40 can be completed. This arrangement permits a tap off, not only at every fractional plate spacing along the bus bars, but also these covers 22 can be reversed in position to provide twice as many spacings.

Further intermediate spacings may be accommodated by providing additional tap off covers 53 such as shown in Figure 10 in which the junction box 23 is located in a position between the extreme positions provided by Figure 2.

In lieu of the several tap off covers of Figures 2 and 10, a single form of universal adjustment tap off cover may be provided as shown in Figure 11. This cover comprises a plate or flange 54 and junction box 23 which together have the length of the access aperture exposed by the removal of cover plate 20, and in addition, an opposite plate or flange 55 of the same length as the plate or flange 54. A pair of filler strips 56 of the length and thickness of the cover plate 20, but of the approximate width of the flanges of side plates 11 and 12, are fitted on the exposed portions of those flanges, after which the junction box can be moved longitudinally to any position desired, leaving the plates 54 and 55 overlapping the adjacent unremoved cover plates 20 to whatever extent may be necessary for the desired position.

According to the modified form of the invention shown in Figure 12, the removable cover plate 20 may itself be utilized as a replacement cover, when the form of terminal connector clamp shown in Figure 13 is employed. This clamp has an upper jaw 57 adapted to hook over the upper edge of the bus bar 16, and a complementary lower jaw 58 which hooks under the lower edge of the bus bar. The jaw 57 has a wide bearing against the side of the bus bar, and the jaw 58 has a wide bearing on the edge of the bus bar. A threaded stem 59 carried by the upper jaw passes through a smooth bore in the lower jaw, and a nut 60 on the stem draws the jaws together, a spacer sleeve 61 being provided on the stem 59 between the jaws. The hook of jaw 57 cams the wide bearing surface thereof against the side at the bus bar. The stem 59 has an integral or connected terminal extension 62 surrounded by a sleeve 63 of insulating material held in place thereon by a nut 64.

When the cover plate 20 has been removed and the connector shown in Fig. 12 has been applied as shown in the desired location, the cover plate 20 is drilled or punched to form an aperture through which the terminal 62 as insulated by the sleeve 63, may project, and the cover plate 20 is replaced and secured in position. Any desired junction box or switch box indicated generally at 65 may be secured to the duct casing by merely providing registering apertures 66 therein to receive the terminal 62 and its sleeve 63.

The branch circuits of distribution systems of this character are generally provided with protection means, such as safety switches, circuit breakers, or similar apparatus. Such protection means may be mounted on a column or wall, in which case the conduit is run from the branch circuit take off down to the box for the protection means where connections are made in the usual manner.

However, in many cases it is advantageous to have the protection means for branch circuits attached to the duct casing, and for this purpose, adaptor bars 34 are furnished which can be fastened to the back of the protection means box. These bars or brackets are provided with clips or bolts so that the protection means box may be fastened to a face of the duct casing, preferably the lower, for an overhead duct. Conduit nippling is then passed between the compartment of the junction box and the safety switch to provide for wiring.

In the embodiment shown in Figure 4, a switch box 35 is provided with knock-outs 36 adapted to register with knock-outs in the box 23, clamps 37 being provided to secure the switch box against the flat portion of the sheet metal replacement cover 22, the clamp 37 extending over the lower flanges of the side plates 11 and 12.

When the switch box 35 has been secured in position on the cover plate 22 adjacent to the junction box 23, the cover 24 is removed. A group of conductors 42, as shown in Figure 3, are passed through an insulating bushing 44 which is mounted in the registering knock-outs 36 and 25 of the switch box 35 and junction box 23. The ends of the conductors 42 inside the junction box 23 are connected to the terminals 40 and the other ends of the conductors 42 are connected to terminals inside the switch box 35 in the conventional manner.

For joining the duct casings of adjacent unit sections together in end to end relation, a coupling plate 46 is provided as shown in Figure 1. This plate 46 is channel-shaped and underlies both of the abutting ends of the aligned section casings in overlapping relation therewith and is securely bolted thereto. Of course, welding or riveting may be employed for this relatively permanent component of the duct casing. In the form shown, the coupling plate 46 is bolted to the joining side plates 11 and 12 and top plates 13 of the adjacent sections. The fourth side is closed by the cover plate 20, which, as hereinbefore described, overlaps both unit sections in view of the staggered spacing of the cover plates.

For joining the aligned ends of the bus bars of adjacent unit sections in end to end relation, the clamps shown in Figures 8, 9, 12 and 13 are employed, although if no current is to be taken off at the bus bar joint, the terminals 40 and 62 may be omitted. Accordingly, the jaw of the device which is used as a bus bar joint is shown in Figure 1 at 29, although, of course, the terminal jaw 30 may be employed at this point if it is desired to take off current.

A particular advantage of the bus bar joint shown is that unit sections can be cut down in length without having to redrill the bus bars, as would be necessary with a through-bolted joint. It is also much more convenient to attach these clamps than would be the case with a through-bolted construction.

When a unit section is cut down in length as suggested, an adaptor 50, as shown in Figure 7, may be employed. This adaptor is preferably a one-piece sheet metal plate construction overlapping the top plate 10, the upper flanges of the side plates 11 and 12, and the side plates themselves, and adapted to receive the cut down section end and another section end, both in telescopic relation.

For supporting the bus bars at the adaptor section, a sliding support 51 is provided, which may be positioned at any point along the adaptor 50 between the section casing ends therein, and secured in place by set screws 52. Of course, the set screws may be replaced by permanent connection, such as welding or riveting, preferably at the center of the adaptor 50, adjustment of the location of the support 51 being made by sliding the adaptor 50 bodily in a longitudinal direction before securing it to the section ends.

In the form shown, the adaptor bus bar insulator support comprises a short section of folded plate corresponding to the plates 10, 11 and 12, in which the plates 13 and 14 are mounted as described for the standard section.

It is obvious from an inspection of Figure 7 that this adjustable section provides a sort of telescopic joint which is capable of a very flexible adjustment of the relatively permanent component of the duct to suit non-standard length conditions.

From the foregoing description, it will be readily apparent that by using the system herein described, a solid bolted type of connection for the attachment of branch circuits to the bus bars is provided, and yet the installer still has the opportunity to move his machines or add additional circuits at any time without making any alterations in the construction of the system. This invention, therefore, is not limited to the particular forms shown, but instead embraces such modifications thereof as fall within the scope of the following claims.

We claim:

1. In an electric distribution system, a prefabricated interchangeable unit conduit section comprising a duct casing having longitudinally extending parallel bus bars mounted therein and insulated therefrom, each end of said section being open and constructed and arranged to be joined in end to end relation with an adjacent section with their casings and bus bars aligned, said casing of said unit section of duct being divided longitudinally into components, one of said components having unit lengths of said longitudinally extending parallel bus bars mounted therein and insulated therefrom, another of said components having its entire length completely made up of separately removable fractional parts, said section being constructed and arranged for the selective removal of any of said fractional parts to locally expose said bus bars for access in making connections thereto at any point along the length of the bus bars exposed by said removal and without disturbing any part of the remainder of said section.

2. In an electric distribution system, a unit section of duct casing having a plurality of longitudinally extending parallel bus bars mounted thereon and insulated therefrom, branch conductors adapted to be secured to said bus bars, said casing having fractional parts selectively removable individually and independently of each other and without disturbing others of the remaining fractional parts remote therefrom to provide an opening for access to said bus bars for securing said branch conductors thereto, one of said fractions being so removed, and said branch connectors being secured against longitudinal movement on the bus bars so exposed to form a connection, in combination with a replacement part substituted for said removed fraction and provided with outlet means constructed and arranged to register with and receive said branch conductors at any point exposed by said removed fraction while the remainder of said replacement part serves for covering said connection and said bus bars.

3. In an electric distribution system, a unit section of duct casing having a plurality of longitudinally extending parallel bus bars mounted therein and insulated therefrom, the casing of said duct having longitudinally spaced apertures therein, in combination with means for taking off branch conductors from said bus bars comprising connectors respectively engaging said bus bars and provided with detachable means for rigidly anchoring them in position thereon and covers for said apertures adapted for selective removal for access to said bus bars for connecting said branch conductors thereto, one of said covers for said access apertures being constructed and arranged for adjustment to provide outlet means for said branch conductors at any point within the access aperture covered by said adjustable cover.

4. In an electric distribution system, a unit section of duct casing, having a plurality of longitudinally extending parallel bus bars mounted therein and insulated therefrom said casing comprising separately removable fractional parts constructed and arranged for the selective removal of any of said fractional parts to provide an access aperture exposing said bus bars, one of said fractional parts being so removed, separate branch circuit connectors for each of said bus bars insertable through said aperture into engagement with their respective bus bars and adapted to be located and secured selectively at any point thereon exposed by said aperture, threaded means on said conductors for rigidly securing them to said bus bars at the point selected, and a cover for said aperture constructed and arranged to provide outlet means for said branch circuit conductors and registering with said secured connectors.

5. In an electric distribution system, a unit section of duct casing having a plurality of longitudinally extending parallel bus bars mounted therein and insulated therefrom, said casing having an aperture therein locally exposing said bus bars, separate connectors for each of said bus bars individually insertable through said aperture into longitudinally slidable engagement with their respective bus bars whereby said connectors may be positioned at any desired location on the bus bars exposed by said aperture, threaded means on each connector for securing it rigidly to its bus bar so positioned in its desired location to prevent further longitudinal sliding thereof, said threaded means securing each conductor to its bus bar, and a cover for said aperture adapted to provide outlet means for branch conductors from said connectors and constructed and arranged for the location of said outlet means in register with said secured connectors.

6. In an electric distribution system, a unit section of duct casing having a plurality of longitudinally extending parallel bus bars mounted therein and insulated therefrom, said casing having an aperture therein to locally expose said bus bars, separate branch connectors for each of said bus bars insertable through said aperture into engagement with their respective bus bars, means for securing said connectors to said bus bars in any longitudinally selected position on the length of the bus bars exposed by said aperture, said means securing said connectors to said bus bars in one longitudinally selected position on the length thereof exposed by said aperture, terminals carried by said connectors and extending in the direction of said aperture, and a replacement cover for said aperture having a junction box adapted to inclose said terminals, said replacement cover being constructed and arranged for the location of said junction box in register with the selected position of said terminals.

7. In an electric distribution system, a unit section of duct casing having a plurality of longitudinally extending parallel bus bars mounted therein and insulated therefrom, the casing of said duct having an aperture therein to locally expose said bus bars, separate branch connectors for each of said bus bars insertable through said aperture into engagement with their respective bus bars, means for securing said connectors to said bus bars in any longitudinally selected position exposed by said aperture, said means securing said connectors to said bus bars in one longitudinally selected position on the length thereof exposed by said aperture, terminals carried by said connectors and extending through said aperture, insulating sleeves surrounding said terminals, a replacement cover having holes through which said terminals and their sleeves extend, one side of said replacement covers facing the aperture, and a terminal inclosing box secured to the other side of said replacement cover and having holes registering with the terminal insulation receiving holes therein.

8. In an electric distribution system, a duct casing having a plurality of longitudinally extending parallel bus bars mounted therein and insulated therefrom, the casing of said duct having an aperture therein locally exposing said bus bars, branch circuit conductor means insertable through said aperture into longitudinally sliding engagement with their respective bus bars and movable therealong throughout the length thereof exposed by said aperture, connector means actuated by rotary movement and securing said conductor means to their respective bus bars at a longitudinally selected point by screw thread pressure, the axis of said rotary movement passing through said aperture, and a cover for said aperture constructed and arranged to provide outlet means for said connector and registering with said secured connectors.

9. In an electric distribution system, a unit section of duct comprising an elongated sheet metal casing channel-shaped in cross section, transverse spacer plates secured in said casing, a plurality of longitudinally extending parallel bus bars, insulators receiving respective phases of said bus bars and engaging said spacer plates, complementary individually removable spacer plates receiving said insulators and secured in said casing coplanar with the first-mentioned plates to secure said insulators and their bus bars therebetween, and sectional cover plates extending from each spacer plate assembly to the adjacent one and covering the open channel shape therebetween, the cover plates adjacent each complementary spacer plate being removable to permit removal of their complementary spacer plate.

10. In an electric distribution system, a duct casing divided longitudinally into components, one of said components having a plurality of longitudinally extending parallel bus bars mounted therein and insulated therefrom, another of said components having its entire length completely made up of separately removable fractional parts, said section being constructed and arranged for the selective removal of any of said fractional parts to locally expose any desired length of said bus bars for access thereto at any point along the length of said fraction without disturbing the remainder, and detachable means insertable through the aperture where said fraction was removed into engagement with one phase of said bus bars for securing a branch connector thereto at any selected point along the exposed length thereof without perforating the same, said securing means being operable by access through the opening left by said removed fraction and rigidly securing said branch connector to said bus bar at said selected point, and means for closing said aperture and forming an outlet for said branch connector.

11. In an electric distribution system, a duct casing divided longitudinally into components, one of said components having a plurality of longitudinally parallel bus bars mounted therein and insulated therefrom, another of said components comprising separately removable fractional parts, said section being constructed and arranged for the selective removal of one of said fractional parts to locally expose said bus bars for access thereto for making connections thereto without disturbing the remainder of said casing and said bus bars, and means longitudinally slidable in said casing for supporting said bus bars therein in insulated relation.

12. In an electric distribution system, a unit section of duct comprising an elongated sheet metal casing channel shaped in cross section, transverse spacer plates secured in said casing, a plurality of longitudinally extending parallel bus bars, means for insulating respective phases of said bus bars from said spacer plates, complementary spacer plates and insulating means secured in said casing coplanar with the first mentioned plates to secure said bus bars therebetween, and sectional cover plates extending from each spacer plate assembly to the adjacent one and covering the open channel shape therebetween and adapted for selective removal for access to said bus bars for connecting branch conductors thereto, one of said covers being constructed and arranged to provide outlet means for said branch conductors at any point within said aperture, all of said covers being removable in pairs adjacent any complementary spacer plate to permit removal thereof and removal of its complementary insulating means.

13. In an electric distribution system, a duct casing divided longitudinally into components, one of said components having a plurality of longitudinally extending parallel bus bars mounted therein and insulated therefrom, another of said components having its entire length completely made up of separately removable fractional parts, said casing being constructed and arranged for the selective removal of any of said fractional parts to locally expose the length of bus bar covered thereby without disturbing the remainder of said casing and bus bars, screw pressure connector means insertable through the aperture where said fractional part is removed into engagement with one phase of said bus bars at longitudinally spaced points, said screw pressure means being sufficient to preserve electrical continuity of said phase even though said phase should be mechanically severed therebetween.

14. In an electric distribution system comprising conduits, each conduit being divided transversely into interchangeable unit sections, each section being divided longitudinally into components, the improvement which comprises one of said components being divided transversely into fractional covers, said covers being of uniform length and spacing intermediate the ends of each section but staggered with respect to the ends thereof, the cover at one end overlapping the other component of the adjacent section, said covers being selectively removable to expose an access opening, and a replacement cover for said exposed access opening convertible to provide outlet means at any longitudinally selected point within said selected access opening.

15. In an electric distribution system comprising conduits, each conduit being divided transversely into interchangeable unit sections, each section being divided longitudinally into components, the improvement which comprises one of said components having transverse partition plates dividing the same into compartments, another of said components being divided transversely into covers for said compartments separately removable to selectively provide an access opening to said compartments, and a replaceable cover for said selected compartment convertible to provide outlet means at any longitudinally selected point within said selected access opening, said transverse plates being uniformly spaced intermediate the ends of their component but staggered with respect to the ends thereof, the cover at one end overlapping the other component of an adjacent shortened section, and a longitudinally slidable partition plate within the compartment covered by said overlapping cover.

16. In an electric distribution system comprising conduits, each conduit being divided transversely into interchangeable unit sections, each section being divided longitudinally into components, the improvement which comprises one of said components being transversely divided into compartments, another of said components being divided into fractional covers for said compartments, means in each unit section for supporting and insulating unit sections of longitudinally extending bus bars therein, said fractional covers being separately removable to expose the bus bars of a selected compartment for access thereto, means for securing branch conductors to said bus bars at any longitudinally selected point in said compartment, said bus bar supporting and insulating means and said branch conductor securing means being both convertible to permit the entire conduit to receive bus bars of different depth, said branch conductors being secured to said bus bars by said securing means at one longitudinally selected point in said compartment, and a replacement cover for said compartment convertible to provide outlet means for said branch conductors aligned with their longitudinally selected position.

17. In an electric distribution system, a prefabricated interchangeable unit conduit section comprising a duct casing having longitudinally extending parallel bus bars mounted therein and insulated therefrom, each end of said section being open and constructed and arranged to be joined in end to end relation with an adjacent section with their casings and bus bars aligned, said casing of said unit section of duct being divided longitudinally into complementary parts, one of said parts being continuous for the section length and shaped to form a channel having said bus bars mounted therein and insulated therefrom, the other longitudinal complementary part being transversely divided at a plurality of spaced points along its length and completely made up of separately removable multiple covers, said covers being arranged in longitudinal succession and substantially abutting relationship, the transverse margins of said covers being removably secured in position and the longitudinal margins thereof being removably secured to the longitudinal margins of said channel forming part for the selective removal of any of said multiple covers to locally expose said bus bars for access in making connections thereto at any point along the length of the bus bars exposed by said removal and without disturbing any part of the remainder of said section.

FRANK L. NOVAK.
EMIL A. HORN.

CERTIFICATE OF CORRECTION.

Patent No. 2,261,857. November 4, 1941.

FRANK L. NOVAK, ET AL.

It is hereby certified that error appears in the printed specification of the above numbered patent requiring correction as follows: Page 3, first column, line 37, for the word "casting" read --casing--; and page 6, second column, line 16, claim 13, for "distributing" read --disturbing--; and that the said Letters Patent should be read with this correction therein that the same may conform to the record of the case in the Patent Office.

Signed and sealed this 9th day of December, A. D. 1941.

Henry Van Arsdale,
(Seal) Acting Commissioner of Patents.